(12) United States Patent
Watson

(10) Patent No.: US 7,297,418 B2
(45) Date of Patent: Nov. 20, 2007

(54) THERMALLY TREATED CARBIDE MATERIAL

(76) Inventor: Daniel Watson, 350 Jennifer La., Driftwood, TX (US) 78619

( * ) Notice: Subject to any disclaimer, the term of this patent is extended or adjusted under 35 U.S.C. 154(b) by 227 days.

(21) Appl. No.: 10/783,934

(22) Filed: Feb. 20, 2004

(65) Prior Publication Data

US 2004/0265647 A1 Dec. 30, 2004

Related U.S. Application Data

(60) Provisional application No. 60/482,030, filed on Jun. 24, 2003.

(51) Int. Cl.
    *B22F 3/00* (2006.01)
(52) U.S. Cl. ........................ 428/698; 428/457
(58) Field of Classification Search ................ 428/698, 428/711; 501/97; 75/203; 148/577, 578; 62/64

See application file for complete search history.

(56) References Cited

U.S. PATENT DOCUMENTS

| | | | |
|---|---|---|---|
| 4,739,622 A | 4/1988 | Smith | |
| 5,031,063 A * | 7/1991 | Hasegawa | ................... 360/120 |
| 5,259,200 A | 11/1993 | Kamody | |
| 5,263,886 A | 11/1993 | Workman | |
| 5,447,035 A | 9/1995 | Workman et al. | |
| 5,512,235 A * | 4/1996 | Cerutti et al. | ................. 419/10 |
| 5,865,913 A | 2/1999 | Paulin et al. | |
| 6,141,974 A | 11/2000 | Waldmann et al. | |
| 6,164,079 A | 12/2000 | Waldmann et al. | |
| 6,314,743 B1 | 11/2001 | Hutchison | |
| 6,537,396 B1 | 3/2003 | Ijames | |
| 6,544,669 B2 | 4/2003 | Groll | |
| 2002/0179204 A1* | 12/2002 | Brunson | ..................... 148/578 |

OTHER PUBLICATIONS

Earl A. Carlson, Cold Treating and Cryogenic Treatment of Steel, ASM Handbook, vol. 4, pp. 203-206, Mar. 2001.

\* cited by examiner

*Primary Examiner*—Jennifer C. McNeil
*Assistant Examiner*—Daniel Miller
(74) *Attorney, Agent, or Firm*—Buskop Law Group, PC; Wendy Buskop

(57) ABSTRACT

The thermally treated carbide materials are made by placing a carbide within a thermal control apparatus and subjecting the carbide to one or more thermal cycles. The first thermal cycles involves introducing a cryogenic material into the thermal control apparatus decreasing the carbide temperature, while preventing over-stressing of the carbide, to a first target temperature at a first temperature rate. The carbide temperature is then increased to a second target temperature at a second temperature rate. The second thermal cycle involves introducing the cryogenic material to decrease the carbide temperature, while preventing over-stressing, to a third temperature at a third temperature rate ranging. The temperature is then increased to a fourth temperature at a fourth temperature rate. The result of the process is a treated carbide without fractures.

25 Claims, 3 Drawing Sheets

THERMALLY TREATED CARBIDE MATERIAL

The present application claims priority to co-pending U.S. Provisional Patent Application Ser. No. 60/482,030 filed on Jun. 24, 2003.

FIELD OF THE INVENTION

The present embodiments relate to carbide materials treated by a cryogenic thermal process.

BACKGROUND OF THE INVENTION

A need exists for a process to treat metals and similar materials of manufacture in order to increase their structural characteristics. For example, in the manufacture of tools and tool components, machinery, engine parts, wear surfaces and like articles from various steels and materials that are used for high wear applications, the common practice is to subject the steel to one or more thermal process treatments, either before or after formation of the steel carbide, so as to modify the properties of at least the exterior of the components. These treatments provide the articles with a longer wear life and the like.

A number of thermal type processes are known in the metallurgical arts to enhance the properties of manufacturing materials, such as steels and the like. One widely used class of such metallurgical processes generally known as quenching typically involves forming an article of the desired metal containing material and then rapidly lowering the temperature of the article followed by a return of the article to ambient temperature. The problem with the current processes is that they are usually uncontrolled and result in over-stressing the material and even fracturing the material rendering it useless.

A further enhancement process for manufacturing materials, such as steel, is in the formation of a nitride containing layer on the surface of an article of the metal containing material that case hardens the material by forming nitrides such as metal nitrides at or near the surface of an article. The formed nitride surface layer may include extremely hard compounds containing nitrides such as CrN, $Fe_2N$, $Fe_3N$ and $Fe_4N$. The formed nitride layer tends to create compressive stresses that improve the properties of the metal containing material, but can also lead to distortions in the article being treated.

Current cryogenic processing is detrimental to the toughness of carbides due to the delicate carbide material being brittle.

A need has long existed for carbide based drilling equipment that is stronger, less brittle and tougher than known materials. A process has long been needed to provide improved drilling, mining and subsea working equipment.

SUMMARY OF THE INVENTION

The in thermally treated carbide is made from a two or more cycle thermal process. The thermally treated carbide is made by placing the carbide within a thermal control apparatus. The thermal control apparatus has a chamber, wherein the chamber temperature is closely regulated. A first cryogenic material is introduced into the thermal control apparatus decreasing the material temperature while preventing over-stressing of the carbide. The temperature of the carbide is reduced to a first target temperature ranging from −40 degrees F. and −380 degrees F. at a first temperature rate ranging from 0.25 degrees F. per minute and 20 degrees F. per minute. When the first target temperature is reached, the cryogenic material is no longer introduced into the chamber. The chamber temperature is, then, increased to a second target temperature ranging from 0 degrees F. and 1400 degrees F. at a second temperature rate ranging from 0.25 degrees F. per minute and 20 degrees F. per minute. The first cycle results in an intermediate carbide material.

The second cycle begins by introducing a second cryogenic material into the thermal control apparatus decreasing the temperature of the intermediate material while preventing over-stressing. The temperature is decreased to a third target temperature ranging from −120° F. degrees F. and −380 degrees F. at a third temperature rate ranging from 0.25 degrees F. per minute and 20 degrees F. per minute. When the second target temperature is reached, the cryogenic material is no longer introduced into the chamber. The temperature of the chamber is increased to a fourth target temperature from 0 degrees F. and 1400 degrees F. at a fourth temperature rate ranging from 0.25 degrees F. per minute and 20 degrees F. per minute. The result of the thermal process is treated carbide without fractures.

BRIEF DESCRIPTION OF THE DRAWINGS

The present embodiments will be explained in greater detail with reference to the appended Figures, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments herein and it can be practiced or carried out in various ways.

The invention is a thermally treated carbide material.

Figure 1:
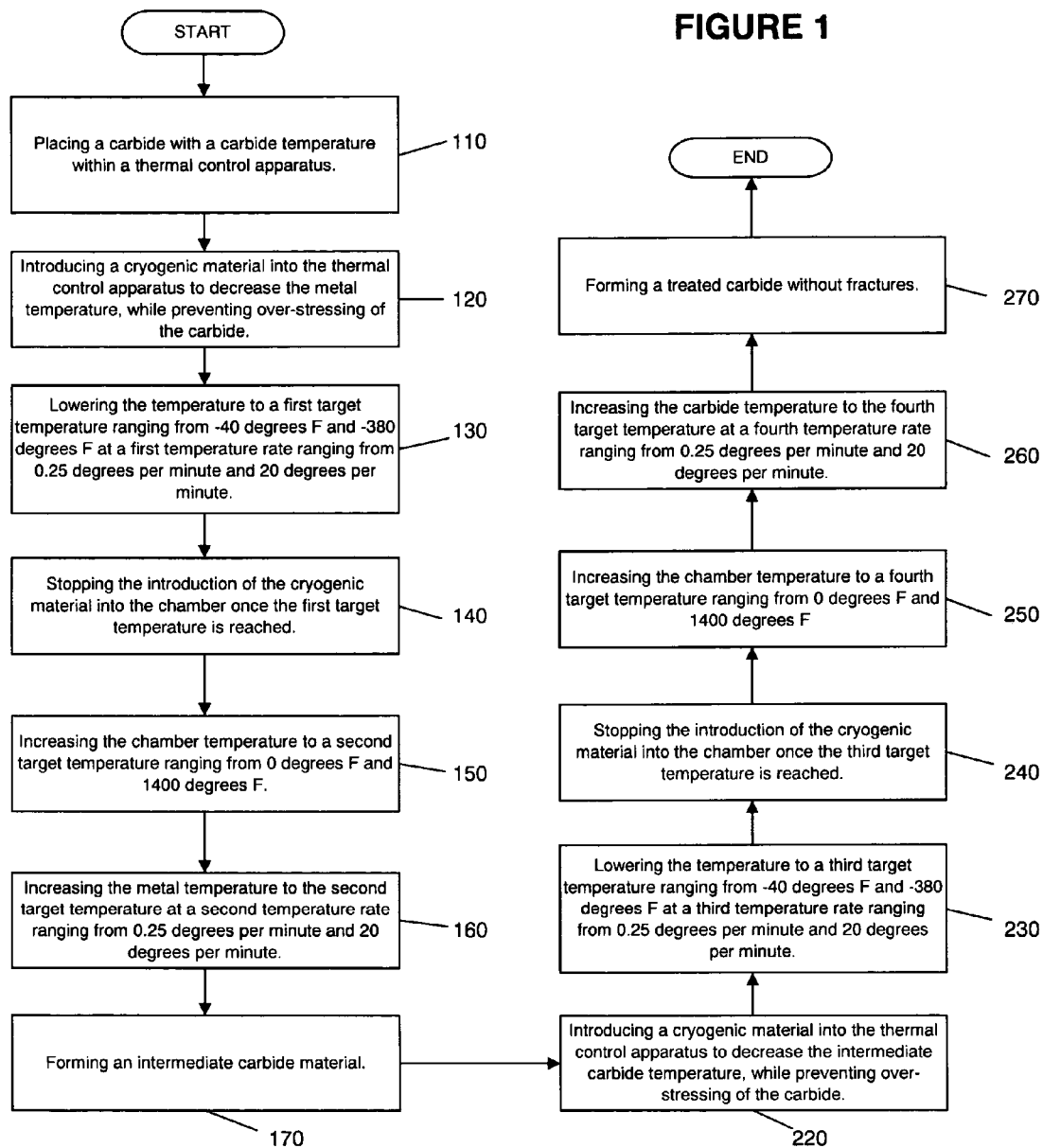
FIG. 1 is a schematic diagram of the steps of the method for treating a drill bit.

FIG. 1 provides the steps of the process. Thermally treated carbide material is made by placing a carbide (10) within a thermal control apparatus (12). The carbide (10) itself has a material temperature (11). The thermal control apparatus (12) has a chamber (14) that has a chamber temperature (15).

Figure 2:
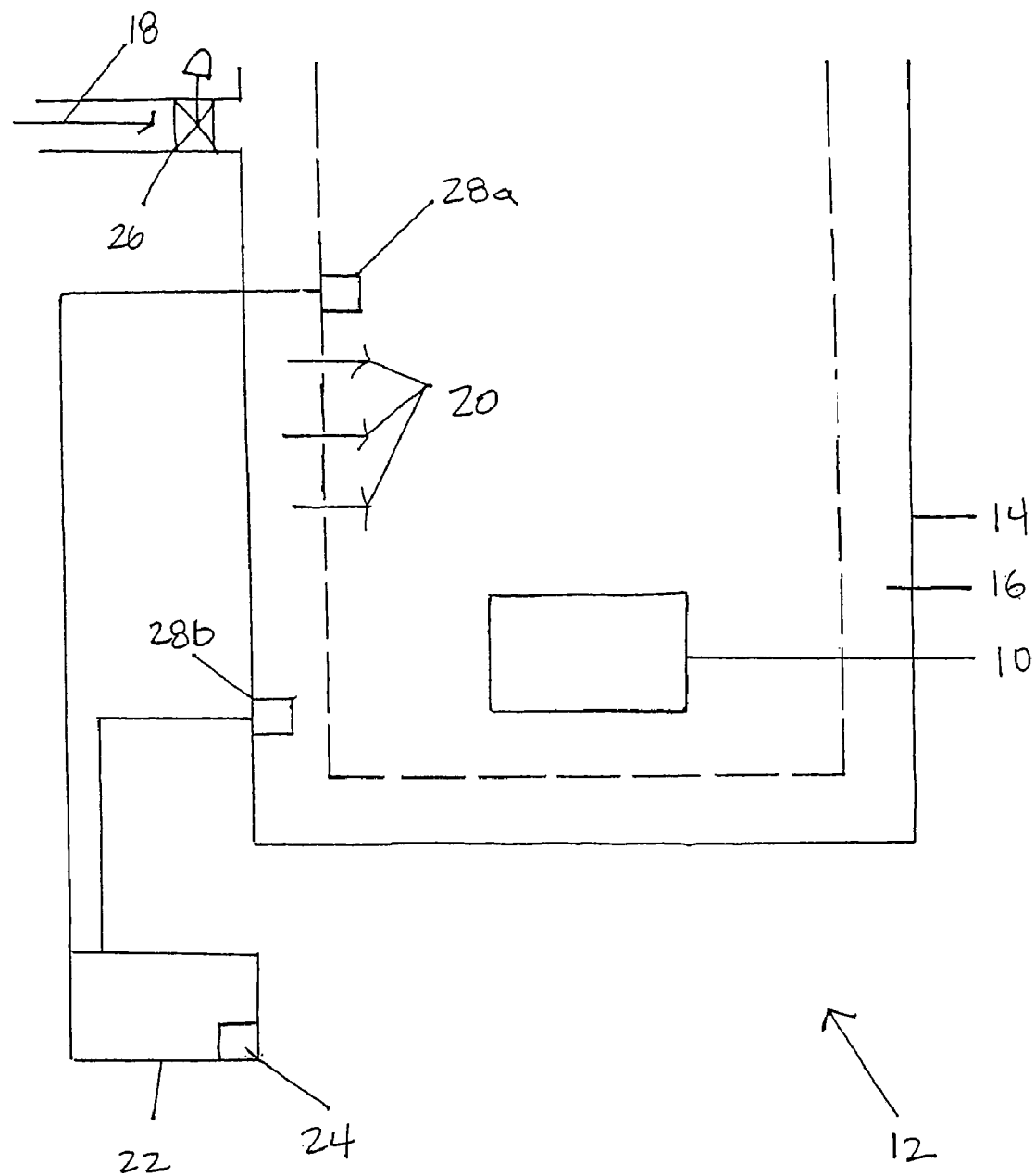
FIG. 2 is a detailed cross section of the chamber used in the method.

FIG. 2 shows a cross sectional detail of the thermal control apparatus (12) that comprises a chamber (14). In the embodiment of FIG. 2 cryogenic material (16) is introduced to the thermal control apparatus, such as through a valve (18) such that the temperature of the chamber (12) cools or raises depending on whether the valve is on or off. The carbide material (10) has a defined material temperature and the chamber has a chamber temperature, which is regulated.

Cryogenic material (16) is introduced into the thermal control apparatus (12) in order to decrease the metal temperature. The cryogenic material is added so that the metal is not over-stressed. Over-stressing includes fracturing the carbide. The temperature of the carbide is decreased to a first target temperature (18) ranging from −40 degrees F. and −380 degrees F. The temperature is decreased at a first temperature rate (20) ranging from 0.25 degrees F. per minute and 20 degrees F. per minute. Once the first target temperature (18) is reached, the cryogenic material is no longer added to the chamber (14).

The thermal apparatus can further include a heat exchanger located within the chamber to provide a cryogenic vapor to the tank. The cryogenic material is released into the heat exchanger thereby absorbing heat from the chamber into the heat exchanger forming a cryogenic vapor that fills the tank. Examples of cryogenic vapors contemplated in this invention are hydrogen, nitrogen, oxygen, helium, argon, and combinations thereof.

The method continues by increasing the chamber temperature (15) to a second target temperature (22) from 0 degrees F. and 1400 degrees F. The material temperature (11) is also increased to the second target temperature (24) at a second temperature rate (26). The second temperature rate ranges from 0.25 degrees F. per minute and 20 degrees F. per minute. The result is an intermediate carbide material (28) with an intermediate material temperature (29).

A second cryogenic material (30) is introduced into the thermal control apparatus (12) decreasing the intermediate material temperature (29) while preventing over-stressing of the intermediate carbide material. The temperature is reduced to a third target temperature (32) ranging from −40 degrees F. and −380 degrees F. at a third temperature rate (34) ranging from 0.25 degrees F. per minute and 20 degrees F. per minute. The method continues by stopping the introduction of the cryogenic material (16) into the chamber (14) once the third target temperature (30) is reached.

The chamber temperature (15) is, then, increased to a fourth target temperature (36) from 0 degrees F. and 1400 degrees F. The intermediate material temperature is, thereby, also increased to the fourth target temperature (36) at a fourth temperature rate (38). The fourth temperature rate (38) ranges from 0.25 degrees F. per minute and 20 degrees F. per minute. The result is a treated carbide without fractures (38).

The carbide in the invention is a carbide of heavy metals forming a hard material. Carbides contemplated by this invention include titanium, scandium, vanadium, chromium, manganese, iron, cobalt, molybdenum, tungsten, niobium, tantalum, silicon, and combinations thereof. The carbide can also be a powder, made from a powder, a sintered mixture, compacted mixture, cemented mixture, or a precipitate within an iron alloy. The carbide of the invention can also be a laminate alone or a laminate disposed on ceramic, wood, polymer, or combination thereof.

Figure 3:
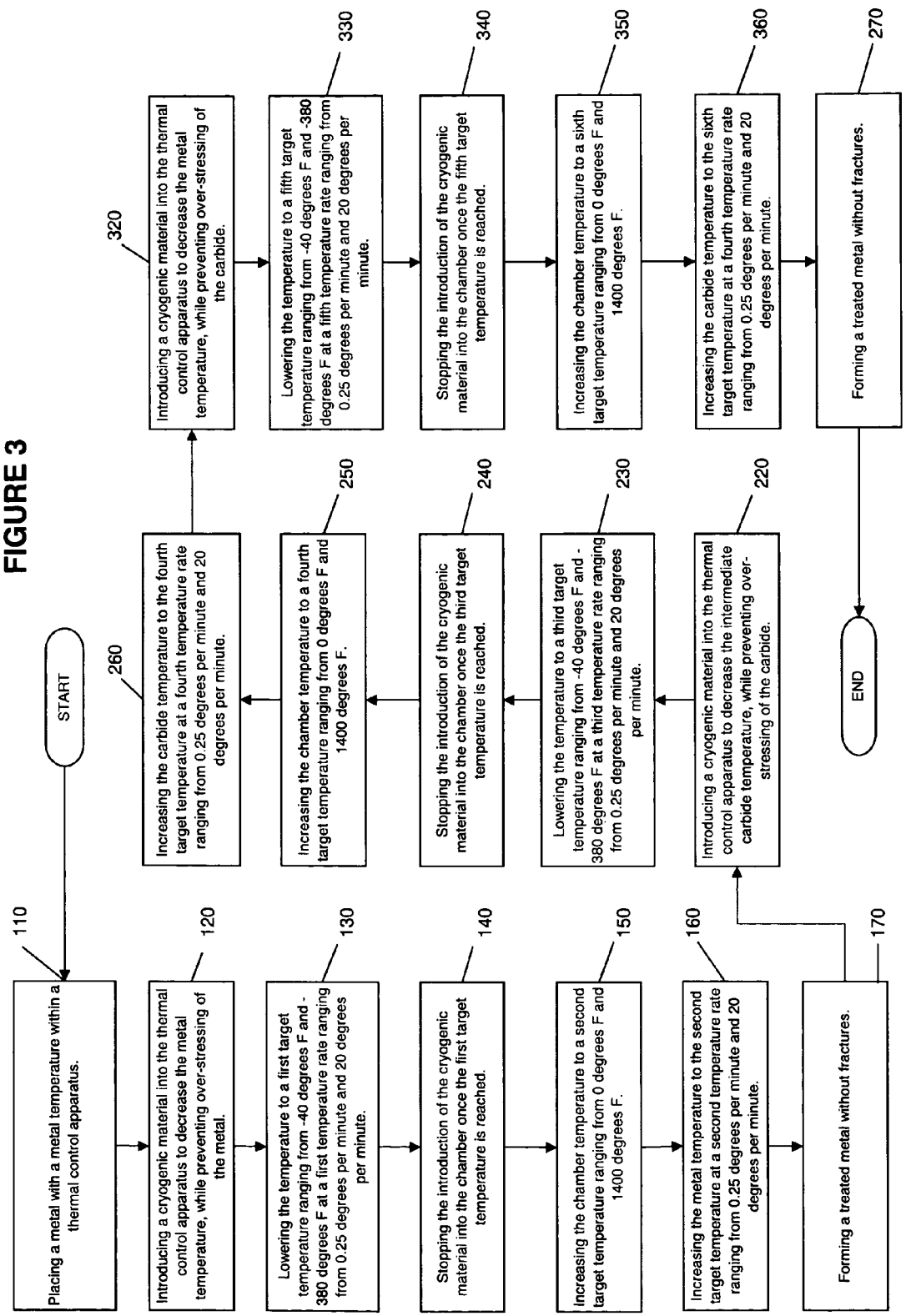
FIG. 3 is a schematic diagram that shows additional optional steps of the method shown in FIG. 1.

FIG. 3 depicts the process of the invention wherein the thermal process includes four or more cycles resulting in a treated metal without fractures (28) and improved structural and metallurgical characteristics.

It should be noted that the treated carbide material described in the invention can not only be used for drilling bits and mining equipment, but it can be used for swords and metals needed for extreme temperatures, such at high subsea pressures or in the extremes of high altitude use, such as, in airplanes, jets, on satellites and other materials used in space.

It should also be noted that the invention can be used wherein the first temperature rate is used to create one or more of a set of desired metallurgical characteristics in the treated carbide, for example, the first temperature rate can cause improved wear resistance and the second temperature rate can cause improved impact resistance. Alternatively the metallurgical characteristics can be hardness, strength and combinations of these properties.

Over-stressing within the context of this invention refers to the act of causing fractures in the carbide or treated material. The present invention is designed to treat the material without causing fractures and related stress defects in the material while causing other advantageous metallurgical characteristics.

The thermal control apparatus of the invention can be a tank with valves, sensors and a control device as shown in FIG. 2, but can also include a heat exchanger (42).

The cryogenic material can be hydrogen, nitrogen, oxygen, helium, argon or combinations of these.

The method used to treat the carbide material of the drilling equipment can have a first, second, third and fourth temperature rates which are determined by the mass of the carbide material.

The carbide can be a laminate, such as a carbide on a ceramic, wood, polymer or combinations thereof. The carbide can have a crystalline structure. The carbide of the invention can be bonded to a second material, and the second material can be iron, iron alloy, copper, copper alloy, diamond, a ceramet and combinations thereof. Alternatively the carbide can be a ceramet.

The carbide of the invention has a crystalline structure. The carbide can be bonded to a second material such as iron, iron alloy, copper, copper alloy, diamond, ceramet, and combinations thereof. The carbide can be an inclusion in a third matrix material, such as iron, iron alloy, copper, copper alloy, ceramet, powdered sintered metals, and combinations thereof. The invention also contemplates that the carbide can be a coating.

In the process, the first temperature rate is different from the second temperature rate to create a desired metallurgical characteristic in the treated carbide. The desired metallurgical characteristics contemplated in this invention include wear-resistance, impact resistance, ductility, hardness, strength, and combinations thereof. The first temperature rate, however, can be substantially the same as the second temperature rate as create a similar effect on the metal.

In an alternative embodiment, the carbide can be further treated by a third cycle. In the third cycle, the cryogenic material (16) is added to the thermal control apparatus (12) to decrease the material temperature (11) while preventing over-stressing of the metal. The material temperature is reduced to a fifth target temperature (38) ranging from −40 degrees F. and −380 degrees F. at a fifth temperature rate (40). The fifth temperature rate (40) ranges from 0.25 degrees F. per minute and 20 degrees F. per minute. When the fifth target temperature (38) is reached, the cryogenic material (16) is no longer introduced into the chamber (14).

The third cycle continues by increasing the chamber temperature (15) to a sixth target temperature (42) and, thereby, increasing the material temperature (11) to the sixth target temperature (42) ranging from 0 degrees F. and 1400 degrees F. The temperature increase is done at a sixth temperature rate (44) ranging from 0.25 degrees F. per minute and 20 degrees F. per minute resulting in a treated carbide without fractures (28) and improved structural and metallurgical characteristics.

The thermal process can further include the step of allowing the metal to soak at the cold temperature for a specific period of time. The period of time for soaking can range from less than 15 minutes to times longer than 96 hours. The preferred aging process for an elevated temperature may be as long as four days to relieve the stress in the metal.

The temperature rates in each cycle are determined by the mass of the carbide. Basing the temperature ranges and rates on the qualities of the carbide relieves stresses, but creates new stress by super-solidification. Super-solidification is the increase in material density and organization due to the decrease of molecular movement in the material during the cryogenic treatment. The method of the invention relieves the stresses created by the cryogenic portion of the treatment in the heat phases that follows the cooling. Through repeated chilling and heating, the molecules are condensed into a more highly organized configuration and relieved of the stresses created therein.

Carbides are delicate and brittle. The method of the invention has the added feature of increasing the durability of the carbide.

The most preferred embodiment of the invention is three thermal cycles of cryogenic treatment with a double heat treatment at the end. The first target temperature is known as the shallow chill. The third target temperature is known as the cold chill. A "heat" process" is when the metal temperature is allowed to return to room temperature or anything above 0 degrees F. "Aging" is defined as holding at room temperature for several days or weeks between chills. Aging is also effective when used in combinations with this thermal process.

The chamber used in the thermal process can be a double-walled insulated chamber, a vacuum chamber, and a vacuum-insulated chamber. Computer control of the cryogenic process consists of a dedicated microprocessor unit which controls injection of the cryogenic material via a solenoid-operated valve. Thermocouples provide real-time temperature measurement, and feedback to the microprocessor, which then follows the programmed temperature targets and rates.

While these embodiments have been described with emphasis on the preferred embodiments, it should be understood that within the scope of the appended claims the embodiments might be practiced other than as specifically described herein.

What is claimed is:

1. A thermally treated carbide material made by the process of the steps comprising:
    a. placing a carbide having a material temperature within a thermal control apparatus comprising a chamber comprising a chamber temperature;
    b. introducing a first cryogenic material into the thermal control apparatus decreasing the material temperature while preventing over-stressing of the carbide, to a first target temperature ranging from −120 degrees F. and −380 degrees F. at a first temperature rate ranging from 0.25 degrees F. per minute and 20 degrees F. per minute;
    c. stopping the introduction of the cryogenic material into the chamber once the first target temperature is reached for at least two hours;
    d. increasing the chamber temperature to a second target temperature from 0 degrees F. and 1400 degrees F.;
    e. increasing the material temperature to the second target temperature at a second temperature rate ranging from 0.25 degrees F. per minute and 20 degrees F. per minute resulting in an intermediate carbide material having an intermediate material temperature and holding that second target temperature for at least fifteen minutes;
    f. introducing a second cryogenic material into the thermal control apparatus decreasing the intermediate material temperature while preventing over-stressing of the intermediate carbide material, to a third target temperature ranging from −120 degrees F. and −380 degrees F. at a third temperature rate ranging from 0.25 degrees F. per minute and 20 degrees F. per minute;
    g. stopping the introduction of the second cryogenic material into the chamber once the third target temperature is reached for at least two hours;
    h. increasing the chamber temperature to a fourth target temperature from 0 degrees F. and 1400 degrees F.;
    i. increasing the intermediate material temperature to the fourth target temperature at a fourth temperature rate ranging from 0.25 degrees F. per minute and 20 degrees F. per minute and holding that second target temperature for at least fifteen minutes; and
    j. repeating the steps of decreasing the material temperature, stopping and holding the introduction of the cryogenic material, and increasing the chamber temperature at least two times consecutively resulting in treated carbide without fractures.

2. The material of claim 1, wherein the carbide is a carbide of heavy metals forming a hard material.

3. The material of claim 2, wherein the carbide is selected from the group consisting of a titanium, a scandium, a vanadium, a chromium, a manganese, an iron, a cobalt, a molybdenum, a tungsten, a niobium, a tantalum, a silicon, and combinations thereof.

4. The material of claim 3, wherein the carbide is a powder or made from a powder.

5. The material of claim 2, wherein the carbide of heavy metals is a sintered, compacted, or cemented mixture.

6. The material of claim 2, wherein the carbide is a precipitate within an iron alloy.

7. The material of claim 1, wherein the first temperature rate is different from the second temperature rate to create a desired metallurgical characteristic in the treated carbide, wherein the characteristic is selected from the group consisting of wear-resistance, impact resistance, ductility, hardness, strength and combinations thereof.

8. The material of claim 1, wherein the carbide is treated using a first temperature rate substantially the same as the second temperature rate.

9. The material of claim 1, wherein the intermediate carbide material is treated further using the steps of:
    a. introducing a third cryogenic material into the thermal control apparatus to decrease the intermediate carbide material temperature and while preventing over-stressing of the intermediate carbide material, to a fifth target temperature ranging from −40 degrees F. and −380 degrees F. at a fifth temperature rate ranging from 0.25 degrees F. per minute and 20 degrees F. per minute;
    b. stopping the introduction of the third cryogenic material into the chamber once the fifth target temperature is reached;
    c. increasing the chamber temperature to a sixth target temperature from 0 degrees F. and 1400 degrees F.; and
    d. increasing the intermediate carbide material temperature to the sixth target temperature at a sixth temperature rate ranging from 0.25 degrees F. per minute and 20 degrees F. per minute resulting in treated carbide without fractures.

10. The material of claim 1, further comprising the step of permitting the carbide to soak at the first target temperature for a first period of time.

11. The material of claim 10, wherein the first period of time ranges from 15 minutes to 96 hours.

12. The material of claim 1, further comprising the step of permitting the carbide to soak at the second target temperature for a second period of time.

13. The material of claim 12, wherein the second period of time ranges from 15 minutes to up to 48 hours.

14. The material of claim 1, wherein the thermal control apparatus further comprises a heat exchanger disposed in the tank to provide a cryogenic vapor to the tank.

15. The material of claim 14, wherein the cryogenic material is released into the heat exchanger thereby absorbing heat from the tank into the heat exchanger forming a cryogenic vapor that fills the tank.

16. The material of claim 15, wherein the cryogenic vapor is a member of the group consisting of hydrogen, nitrogen, oxygen, helium, argon, and combinations thereof.

17. The material of claim 1, wherein the first temperature rate, the second temperature rate, the third temperature rate and the fourth temperature rate are determined by the mass of the carbide.

18. The material of claim 1, wherein the carbide is a laminate.

19. The material of claim 18, wherein the laminate is a carbide disposed on a member of the group consisting of a ceramic, a wood, a polymer, and combination thereof.

20. The material of claim 1, wherein the carbide has a crystalline structure.

21. The material of claim 1, wherein the carbide is bonded to a second material.

22. The material of claim 21, wherein the second material is selected from the group consisting of an iron, an iron alloy, a copper, a copper alloy, a diamond, a ceramet, and combinations thereof.

23. The material of claim 1, wherein the carbide is an inclusion in a third matrix material.

24. The material of claim 23, wherein the third matrix material is a member of the group consisting of an iron, an iron alloy, a copper, a copper alloy, a ceramet, a powdered sintered metals, and combinations thereof.

25. The material of claim 1, wherein the carbide is a coating.

* * * * *